Sept. 2, 1969  C. W. SCHREINER, JR  3,464,649
MISSILE SYSTEM WITH HEADING PLUS DRIFT CONTROL
Filed Dec. 20, 1967  3 Sheets-Sheet 1

Charles W. Schreiner Jr.
INVENTOR.

Charles W. Schreiner Jr.
INVENTOR.

United States Patent Office 3,464,649
Patented Sept. 2, 1969

3,464,649
MISSILE SYSTEM WITH HEADING
PLUS DRIFT CONTROL
Charles W. Schreiner, Jr., Burkville, Ala., assignor to the United States of America as represented by the Secretary of the Army
Filed Dec. 20, 1967, Ser. No. 692,057
Int. Cl. F41j 9/10; B64d 3/00
U.S. Cl. 244—3.2                           4 Claims

ABSTRACT OF THE DISCLOSURE

The trajectory of an artillery type missile is affected by a novel system for closely controlling the velocity vector during the missile's boost acceleration phase. This is accomplished by employing sensing means to measure transverse accelerations, attitude angular acceleration, and the forward acceleration of the missile; and utilizing computer means to derive steering signals representative of the first and second derivatives of the missile attitude angle, the missile transverse velocity and the missile transverse acceleration.

---

The invention described herein may be manufactured and used by or for the Government for governmental purposes without the payment of any royalties thereon.

Artillery type rockets are sometimes subjected to certain forces which can produce an unacceptable velocity vector at thrust termination. Two such forces are thrust malalignment and transverse winds. Heading errors resulting from these forces can be corrected by directional control of the missile during its boost phase, i.e., by control over the angle of the velocity vector of the missile. Such control can be effected by utilizing missile transverse acceleration, missile attitude angular acceleration, and the missile attitude angle multiplied by the missile forward acceleration. Another method of effecting control of the missile relies upon the missile transverse velocity, the missile transverse acceleration, attitude angle rate and missile attitude angle acceleration.

In a strictly heading control system, in which only missile attitude angle and its derivatives are included in the control term, it is not possible to control the missile velocity vector to a very high degree while the missile is subjected to both large thrust malalignments and large transverse winds. A loose heading control can be designed to compensate for wind drift when thrust malalignment is low; however, it cannot successfully work in the presence of large thrust malalignments, unless some other means is used to minimize the thrust malalignment. The heading plus drift control system according to the present invention is based principally on the control of the missile velocity vector angle during boost by a control term containing both missile attitude angle $\theta$, and its derivatives, and missile transverse velocity $dy/dt$, and its derivatives. Of course proper gain terms must be provided for each control term according to the needs of any particular overall system.

An X, Y, Z coordinate system will be used herein to define the invention where X is the direction in which the missile is fired, Y is a direction perpendicular to X and in the horizontal plane and Z is the direction perpendicular to X and in the vertical plane. The attitude angle of the missile in the XY plane is defined as $\theta$. Only control of the missile in the horizontal plane will be discussed since in essence the action in either pitch or yaw is basically the same and since transverse winds act primarily in the horizontal plane.

It is an object of the present invention to provide a missile that is capable of accurate flight in the presence of large thrust malalignments and large transverse winds.

It is another object of this invention to provide a missile control system usable with either proportional of "off-on" type controls.

Other objects and advantages of this invention will become fully apparent from the following detailed description when taken together with the accompanying drawings in which.

Figure 1:
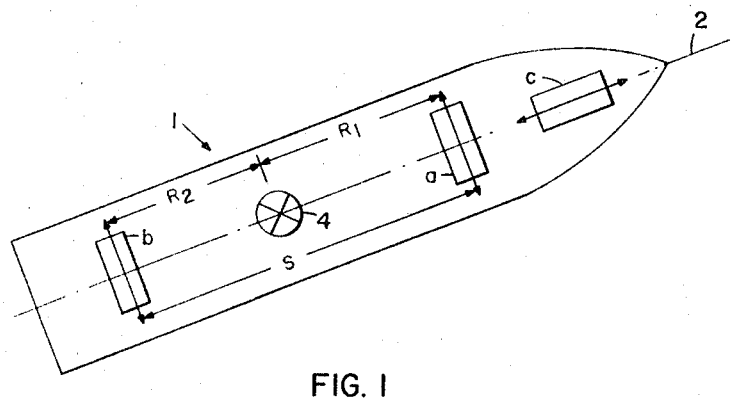
FIGURE 1 illustrates the missile mounting of the required linear accelerometers in a first embodiment of the invention.

Referring now to FIGURE 1, missile 1 carries a first accelerometer $a$ and a second accelerometer $b$, both mounted on the body of the missile, having their axes parallel to each other and perpendicular to the missile axis 2. Accelerometer $a$ is positioned a distance $R_1$ from the missile center of turning 4 and accelerometer $b$ is positioned a distance $R_2$ from point 4. A third accelerometer $c$ is mounted on the missile body with its sensitive axis parallel to the missile axis.

The output of a single linear accelerometer mounted rigid to and with its sensitive axis perpendicular to the missile axis is $$\ddot{Y} - \ddot{X}\theta + \ddot{R}\theta$$

assuming a negligible cross-talk accelerometer. In this expression $$\ddot{Y}$$

is the second derivative of Y with respect to time, i.e., the transverse acceleration of the missile;

$$\ddot{X}$$

is the missile forward acceleration, $$\ddot{\theta}$$

is the second derivative of the missile attitude angle, and R is the distance the accelerometer is spaced from the missile center of turning.

Figure 2:
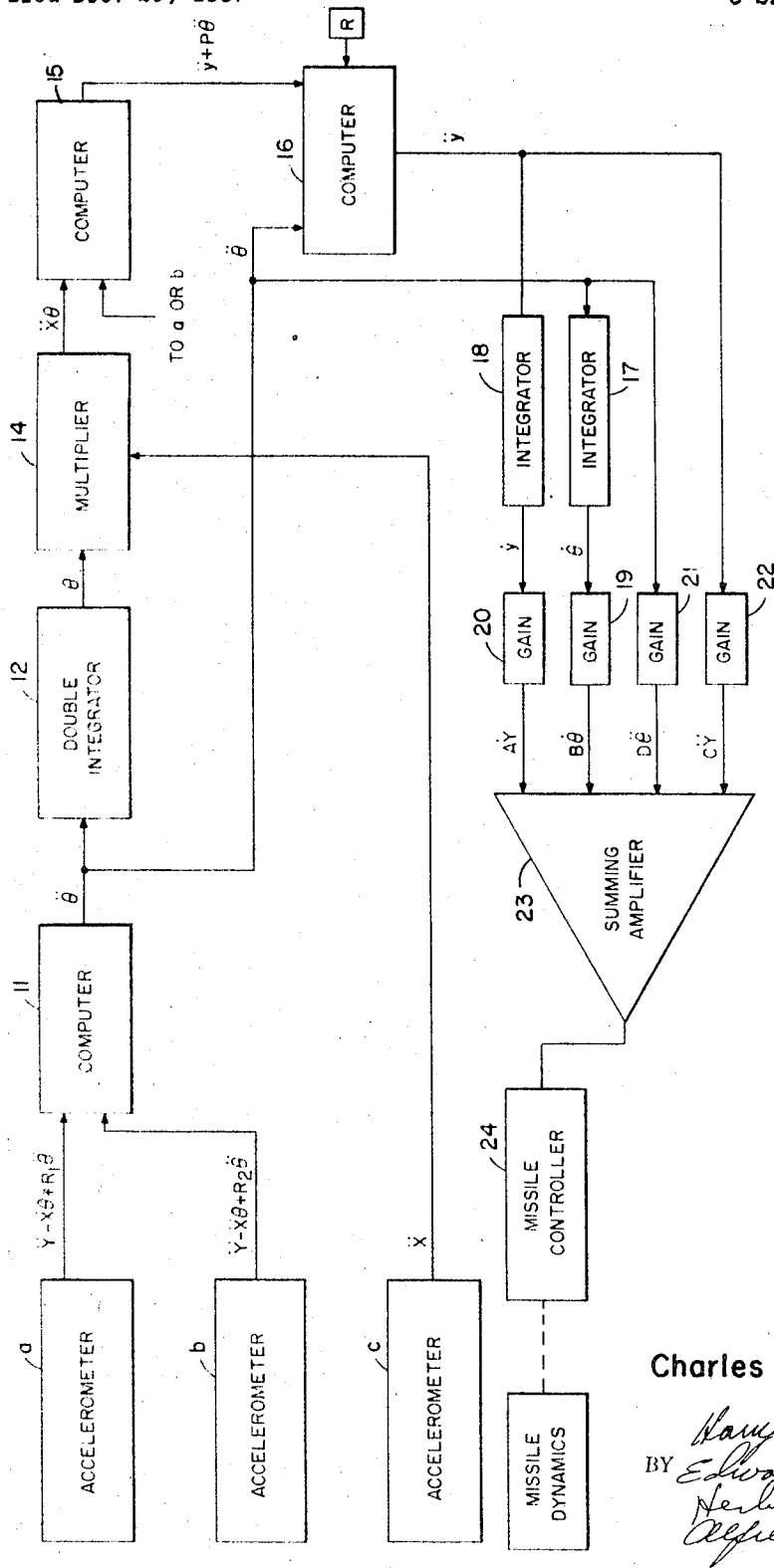
FIGURE 2 is a block diagram representation of a first embodiment of the invention.

The output of accelerometer $a$, referring now to FIGURE 2 and the previous definitions of terms in the horizontal plane, is $$\ddot{Y} - \ddot{X}\theta + R_1\ddot{\theta} \pm e_{cta}$$

and from accelerometer $b$ is $$\ddot{Y} - \ddot{X}\theta + R_2\ddot{\theta} \pm e_{ctb}$$

where $e_{cta}$ and $e_{ctb}$ are errors due to cross-talk in the accelerometers $a$ and $b$ respectively. The cross-talk errors are deemed insignificant and will not be considered henceforth. The outputs from accelerometers $a$ and $b$ are fed into a special purpose computer 11 which performs the calculation $$\frac{a-b}{s} = \ddot{\theta}$$

where $s$ is the algebraic sum of $R_1$ and $R_2$. The output of computer 11 is connected to an integrator circuit 12 where a double integration is performed.

The output of integrator 12 is multiplied in multiplier 14 by $$\ddot{X}$$

the output of accelerometer $c$, to obtain the product of $$\ddot{X}\theta$$

A second special purpose computer 15 has a first input connected to the output of multiplier 14 and a second input connected to either accelerometer $a$ or $b$. To obtain the missile transverse acceleration a further computer 16 is connected to computer 15, computer 11 and to a signal source R which provides a constant equal to the value of $R_1$ the distance from the center of turning of the missile to the sensitive axis of accelerometers $a$ and $b$. Two integrators 17 and 18 are provided to integrate the outputs of computers 11 and 16 and these integrators provide the final two terms needed for generating the required terms for the missile control signal. Gain circuits 19–22 provide the proper gain for each of the control terms $$\dot{\theta}, \ddot{\theta}, \dot{Y}$$

and $$\ddot{Y}$$

prior to the summation of these terms in summing amplifier 23.

The output of summing amplifier 23 is the desired control signal $$A\dot{Y}+B\dot{\theta}+C\ddot{Y}+D\ddot{\theta}$$

This signal then is applied to missile controller 24 which may be any conventional type, for example, a plurality of jet vanes. The control force from controller 24, through the missile dynamics reduces the magnitude of the control signal to an acceptable value in the manner of a conventional closed loop system.

Figure 3:
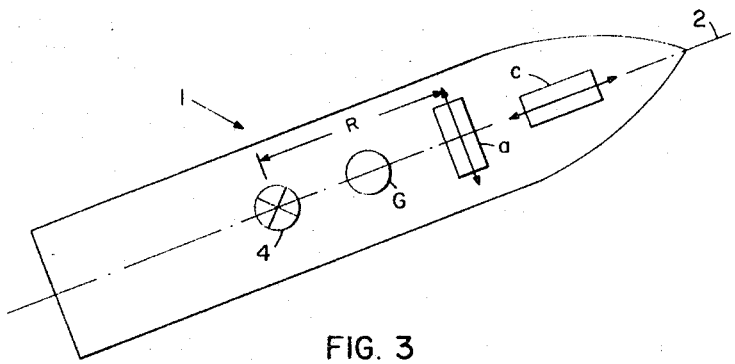
FIGURE 3 illustrates the missile mounting of the required motion sensing devices in a second embodiment of the invention.
Figure 4:
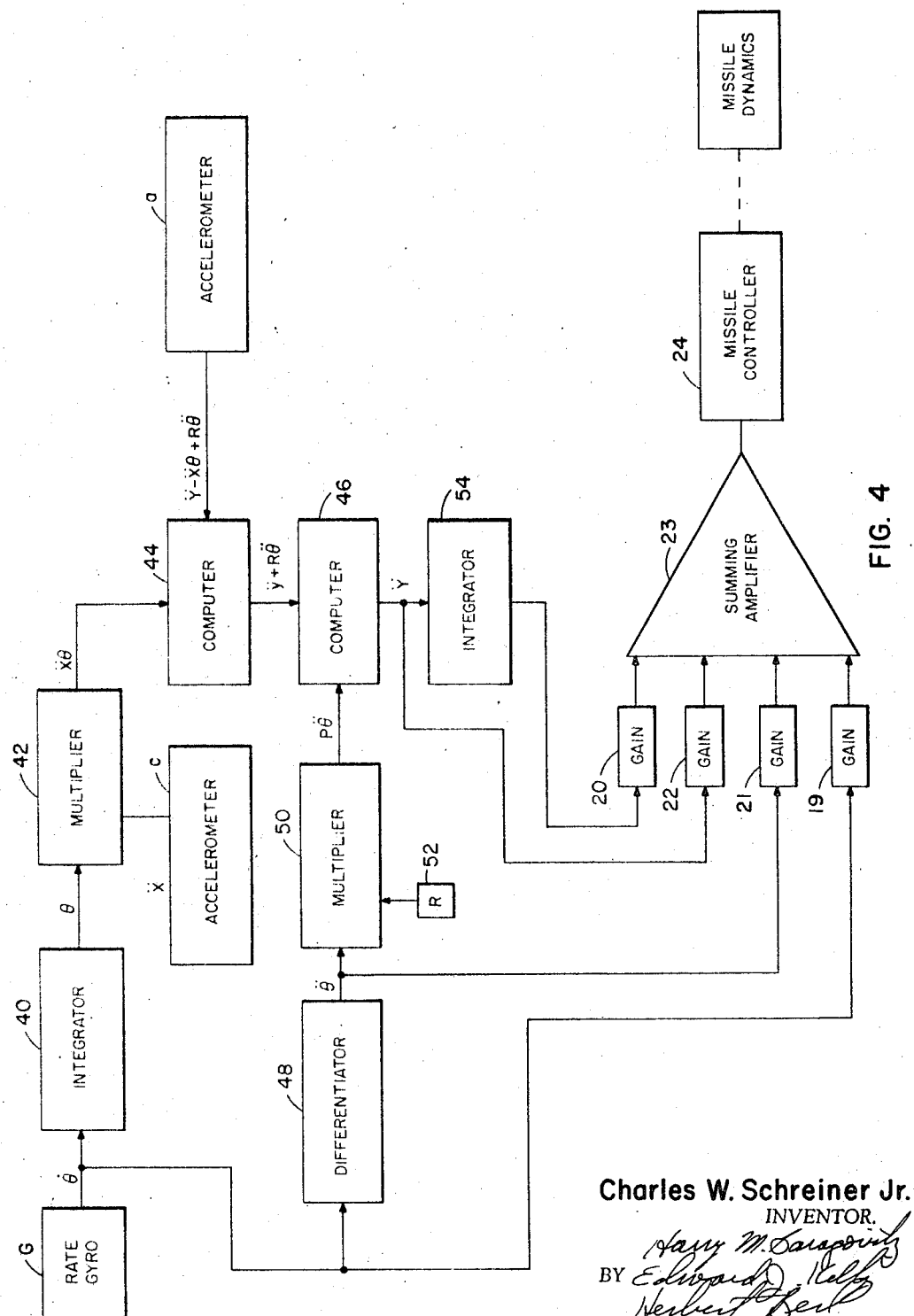
FIGURE 4 is a block diagram representation of a second embodiment of the invention.

The embodiment of the invention illustrated in FIGURES 3 and 4 requires three measuring instruments: a first linear accelerometer $a$ having its sensitive axis perpendicular to the missile axis 2; a second linear accelerometer $c$ with its sensitive axis parallel to the missile axis; and a rate gyro G, all of which are mounted on the missile frame.

Referring now to FIGURE 4, the first task is to eliminate the $$\ddot{X}\theta$$

term from the output of accelerometer $a$. This output is the same as that of accelerometer $a$ of the first embodiment. The output of gyro $$G, \dot{\theta}$$

is integrated by integrator 40 to obtain $\theta$. This signal is then multiplied by circuit 42, which has a second input from accelerometer $c$, to yield $$\ddot{X}\theta$$

Connected to the output of multiplier 42 is a special purpose computer 44 having a second input from accelerometer $a$ which provides a first input for a second computer 46. A second input for this computer is obtained by differentiating the output of gyro G in differentiator 48 and multiplying the result by the constant R in multiplier 50. When the output of computer 46 is integrated in integrator 54 it is seen that we have the same control terms to apply to the gain circuits 19–21 as was obtained with the first embodiment. From this point on the circuit functions identically with that of FIGURE 2.

The system illustrated in FIGURE 4 has particular merit where the accelerometer output error due to crosstalk is too large to permit the double integration to arrive at the $\theta$ term.

The system of FIGURE 4 could be further modified, if desired, by substituting a heading gyro for the rate gyro. If this were the case the output therefrom ($\theta$) would be applied directly to function multiplier 42.

I claim:

1. A missile system comprising: a missile, a first motion sensing means mounted on the body of said missile providing a first output signal; a second motion sensing means mounted on the body of said missile and providing a second output signal; a third motion sensing means mounted on the body of said missile for providing a third output signal; means for combining said output signals for providing a control signal for said missile; and missile controller connected to said combining means for compensating said missile flight for variations due to thrust malalignments and drift due to transverse winds, wherein said first motion sensing means is an accelerometer positioned forwardly of the missile center of turning, its sensitive axis perpendicular to the longitudinal axis of the missile and providing a signal related to the forward and transverse accelerations of said missile; said second motion sensing means is an accelerometer positioned rearwardly of the missile center of turning, having its sensitive axis perpendicular to the longitudinal axis of said missile, and providing a signal related to the forward and transverse accelerations of said missile; and said third motion sensing means is an accelerometer having its sensitive axis parallel to the longitudinal axis of said missile.

2. A missile system as set forth in claim 1 wherein said combining means comprises; a first computer connected to said first and second accelerometers and providing a first control term; an integrator connected to the output of said first computer providing a second control term; a second computer connected to the output of said first computer providing a third control term; a second integrator connected to the output of said second computer providing a fourth control term; and means for summing said first, second, third, and fourth control terms.

3. A missile system as set forth in claim 2 further including: a double integrator connected to the output of said first computer; a multiplier having a first input connected to the output of said double integrator and a second input connected to said third accelerometer; a third computer having a first input connected to the output of said multiplier and a second input connected to one of said accelerometers, the output of said third computer being connected to a first input of said second computer; and said second computer having a second input connected to the output of said first computer.

4. A missile system comprising: a missile; a first motion sensing means mounted on the body of said missile providing a first output signal; a second motion sensing means mounted on the body of said missile and providing a second output signal; a third motion sensing means mounted on the body of said missile for providing a third output signal; means for combining said output signals for providing a control signal for said missile; and missile controller connected to said combining means for compensating said missile flight for variations due to thrust malalignments and drift due to transverse winds, wherein said first motion sensing means is an accelerometer having its sensitive axis perpendicular to the longitudinal axis of said missile and providing a signal related to the forward and transverse accelerations of the missile; said second motion sensing means is a gyro providing a signal related to the heading angle of said missile; and said third motion sensing means is an accelerometer having its sensitive axis parallel to the longitudinal axis of said missile, and said combining means comprises; an integrator connected to the output of said gyro providing a first control term; a multiplier having a first input connected to the output of said integrator and a second input connected to said third motion sensing device; a first computer having a first input connected to the output of said multiplier and a second input connected to said first motion sensing device; a differentiator connected to the output of said gyro and providing a second control term; a second computer having a first input connected to the output of said first computer and a second input connected to the output of said differentiator and providing a third control term; a second integrator connected to the output of said computer; providing a fourth control term; and means for summing said first, second, third, and fourth control terms.

References Cited

UNITED STATES PATENTS

| | | | |
|---|---|---|---|
| 2,873,074 | 2/1959 | Harris et al. | 244—3.21 |
| 2,932,467 | 4/1960 | Scorgie | 244—3.15 |
| 2,946,542 | 7/1960 | Ciscel | 244—77 |
| 2,984,435 | 5/1961 | Faith et al. | 244—3.2 |
| 2,985,409 | 5/1961 | Atwood et al. | 244—77 |
| 3,132,828 | 5/1964 | Edinger et al. | 244—77 |
| 3,188,019 | 6/1965 | Boutin | 244—3.2 |
| 3,362,658 | 1/1968 | Ito et al. | 244—3.2 |

OTHER REFERENCES

AF. Manual 52–31, Guided Missiles Fundamentals, Sept. 20, 1957, pp. 428–430 relied on. UG 630u491 1957 C. 2.

VERLIN R. PENDEGRASS, Primary Examiner